(12) United States Patent
Kwon et al.

(10) Patent No.: US 10,746,260 B2
(45) Date of Patent: Aug. 18, 2020

(54) DUAL CLUTCH TRANSMISSION

(71) Applicants: Hyundai Motor Company, Seoul (KR); Kia Motors Corp., Seoul (KR)

(72) Inventors: Sun Sung Kwon, Anyang-si (KR); Soon Ki Eo, Ansan-si (KR); Yeo Hyeon Gwon, Yongin-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 603 days.

(21) Appl. No.: 15/645,502

(22) Filed: Jul. 10, 2017

(65) Prior Publication Data
US 2018/0163821 A1   Jun. 14, 2018

(30) Foreign Application Priority Data

Dec. 13, 2016   (KR) .................. 10-2016-0169996

(51) Int. Cl.
| | |
|---|---|
| *F16H 3/00* | (2006.01) |
| *F16H 3/091* | (2006.01) |
| *F16H 63/20* | (2006.01) |
| *F16H 61/688* | (2006.01) |
| *F16H 63/32* | (2006.01) |
| *F16H 63/38* | (2006.01) |
| *F16H 63/30* | (2006.01) |

(52) U.S. Cl.
CPC ........... *F16H 3/0915* (2013.01); *F16H 3/006* (2013.01); *F16H 61/688* (2013.01); *F16H 63/206* (2013.01); *F16H 63/32* (2013.01); *F16H 63/38* (2013.01); *F16H 2063/3079* (2013.01); *F16H 2063/321* (2013.01); *F16H 2200/006* (2013.01)

(58) Field of Classification Search
CPC ...... F16H 3/006; F16H 3/0915; F16H 61/688; F16H 63/206; F16H 63/32; F16H 63/38; F16H 2200/006
USPC .......................................................... 74/330
See application file for complete search history.

(56) References Cited

U.S. PATENT DOCUMENTS

| | | | | |
|---|---|---|---|---|
| 4,621,537 A | * | 11/1986 | Piazza | F16H 63/206 74/473.24 |
| 5,737,969 A | * | 4/1998 | Brown | F16H 63/206 74/335 |
| 5,893,293 A | * | 4/1999 | Earp | F16H 63/206 74/335 |

(Continued)

FOREIGN PATENT DOCUMENTS

| | | |
|---|---|---|
| DE | 10 2014 004 691 | * 10/2015 |
| KR | 10-2010-0067249 A | 6/2010 |

*Primary Examiner* — William C Joyce
(74) *Attorney, Agent, or Firm* — Morgan, Lewis & Bockius LLP

(57) ABSTRACT

A dual clutch transmission may include a first input shaft having a plurality of odd stage driving gears; a second input shaft disposed to have a concentric shaft with the first input shaft and including a plurality of even stage driving gears; an output shaft; a counter shaft disposed parallel to the first input shaft, the second input shaft, and the output shaft to continuously transfer power to the output shaft and including odd stage driven gears engaged with the odd stage driving gears and even stage driven gears engaged with the even stage driving gears; a plurality of synchronous devices; a plurality of shift forks coupled to the plurality of synchronous devices; and one shift rail provided to commonly guide a linear sliding of the plurality of shift forks.

10 Claims, 5 Drawing Sheets

(56) References Cited

U.S. PATENT DOCUMENTS

| | | | | |
|---|---|---|---|---|
| 6,026,702 | A * | 2/2000 | Dreier | F16H 63/206 |
| | | | | 74/473.21 |
| 6,845,685 | B2 * | 1/2005 | Brandwitte | F16H 63/206 |
| | | | | 74/473.25 |
| 7,472,617 | B2 * | 1/2009 | Nicklass | F16H 3/006 |
| | | | | 74/331 |
| 8,042,419 | B2 * | 10/2011 | Mizuno | F16H 63/18 |
| | | | | 74/337.5 |
| 8,468,907 | B2 * | 6/2013 | Wild | F16H 61/32 |
| | | | | 74/473.36 |
| 8,627,739 | B2 * | 1/2014 | Tooman | F16H 63/3023 |
| | | | | 74/473.36 |
| 9,068,627 | B2 * | 6/2015 | Wechs | F16H 3/006 |

* cited by examiner

DUAL CLUTCH TRANSMISSION

CROSS-REFERENCE(S) TO RELATED APPLICATIONS

The present application claims priority to Korean Patent Application No. 10-2016-0169996 filed on Dec. 13, 2016, the entire contents of which is incorporated herein for all purposes by this reference.

BACKGROUND OF THE INVENTION

Field of the Invention

The present invention relates to a dual clutch transmission, and more particularly, to a configuration of a shift operating mechanism of the transmission.

Description of Related Art

A dual clutch transmission (DCT) is configured to shift power input to two clutches using a synchromesh shift mechanism.

As the number of shift stages to be implemented by a transmission is increased, the synchromesh shift mechanism generally has a complex shift operating mechanism to selectively control the corresponding synchronizing device.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a dual clutch transmission configured for improving the mountability on a vehicle and reducing the size and weight of the transmission to improve fuel efficiency of the vehicle, by accurately and smoothly performing a required shift operation without causing an increase of the overall length of the transmission while configuring the arrangement of a shift operating mechanism as simple as possible in the dual clutch transmission configured to implement a plurality of shift stages.

According to an exemplary embodiment of the present invention, there is provided a dual clutch transmission including: a first input shaft including a plurality of odd stage driving gears; a second input shaft disposed to have a concentric shaft with the first input shaft and including a plurality of even stage driving gears; an output shaft disposed to have a concentric shaft with the first input shaft; a counter shaft disposed parallel to the first input shaft, the second input shaft, and the output shaft to always transfer power to the output shaft and including odd stage driven gears engaged with the odd stage driving gears and even stage driven gears engaged with the even stage driving gears; a plurality of synchronous devices included in the first input shaft, the second input shaft, and the counter shaft; a plurality of shift forks coupled to the plurality of synchronous devices; and one shift rail configured to commonly guide a linear sliding of the plurality of shift forks.

The odd stage driving gears of the first input shaft and the even stage driving gears of the second input shaft may be disposed on a straight line to be classified into an odd stage driving gear group and an even stage driving gear group; and a reverse driving gear may be disposed between the odd stage driving gear group and the even stage driving gear group.

The even stage driving gear group may include four driving gears, the shift stages implemented by two driving gears which are adjacent to each other on both sides among the four driving gears disposed in a line and may be disposed to have a difference of two stages, and intermediate two driving gears among the four driving gears may be disposed to have a difference of the shift stage of four or more stages.

The four driving gears included in the even stage driving gear group may have an eighth stage driving gear, a sixth stage driving gear, a second stage driving gear, and a fourth stage driving gear which are sequentially disposed.

The odd stage driving gear group may include three driving gears, the shift stages implemented by two driving gears which are adjacent to each other among the three driving gears disposed in a line and may be disposed to have a difference of two stages, and a center driving gear and the remaining one driving gear may be disposed to have a difference of the shift stage of four or more stages.

The three driving gears included in the odd stage driving gear group may have a third stage driving gear, a first stage driving gear, and a seventh stage driving gear which are sequentially disposed.

A shift ratio of a third stage, which is the shift stage formed by the third stage driving gear may be greater than 1; the shift ratio of a seventh stage, which is the shift stage formed by the seventh stage driving gear may be smaller than 1; and the shift ratio of a fifth stage shift stage between the third stage and the seventh stage may be 1, which is implemented by directly connecting the first input shaft and the output shaft.

The fourth stage driving gear and the third stage driving gear may be each disposed on both sides of the reverse driving gear; and an eighth stage driven gear, a sixth stage driven gear, a second stage driven gear, a fourth stage driven gear, a reverse driven gear, a third stage driven gear, a first stage driven gear, and a seventh stage driven gear may be sequentially disposed on the counter shaft.

The second input shaft may include a 6&8 synchronous device to switch from a neutral state to a state in which the sixth stage driving gear and the eighth stage driving gear are respectively connected to the second input shaft; the first input shaft may include a 5&7 synchronous device to switch from the neutral state to a state in which the seventh stage driving gear and the output shaft are respectively connected to the first input shaft; the counter shaft may include a 2&4 synchronous device to switch from the neutral state to a state in which the second stage driven gear and the fourth stage driven gear are respectively connected to the counter shaft; the counter shaft may include a reverse synchronous device to switch from the neutral state to a state in which the reverse driven gear is connected to the counter shaft; and the counter shaft may include a 1&3 synchronous device to switch from the neutral state to a state in which the first stage driven gear and the third stage driven gear are respectively connected to the counter shaft.

The plurality of shift forks may include a 6&8 shift fork coupled to the 6&8 synchronous device, a 2&4 shift fork coupled to the 2&4 synchronous device, a reverse shift fork coupled to the reverse synchronous device, a 1&3 shift fork coupled to the 1&3 synchronous device, and a 5&7 shift fork coupled to the 5&7 synchronous device.

The plurality of shift forks may each include a detent mechanism configured to provide an elastic force to a detent groove formed in the shift rail to move and maintain a stable and accurate position for the shift rail.

The 6&8 shift fork, the 2&4 shift fork, the reverse shift fork, the 1&3 shift fork, and the 5&7 shift fork may be sequentially disposed in a line on the shift rail.

The methods and apparatuses of the present invention have other features and advantages which will be apparent form or are set forth in more detail in the accompanying drawings, which are incorporated herein, and the following Detailed Description, which together serve to explain certain principles of the present invention.

Figure 1:
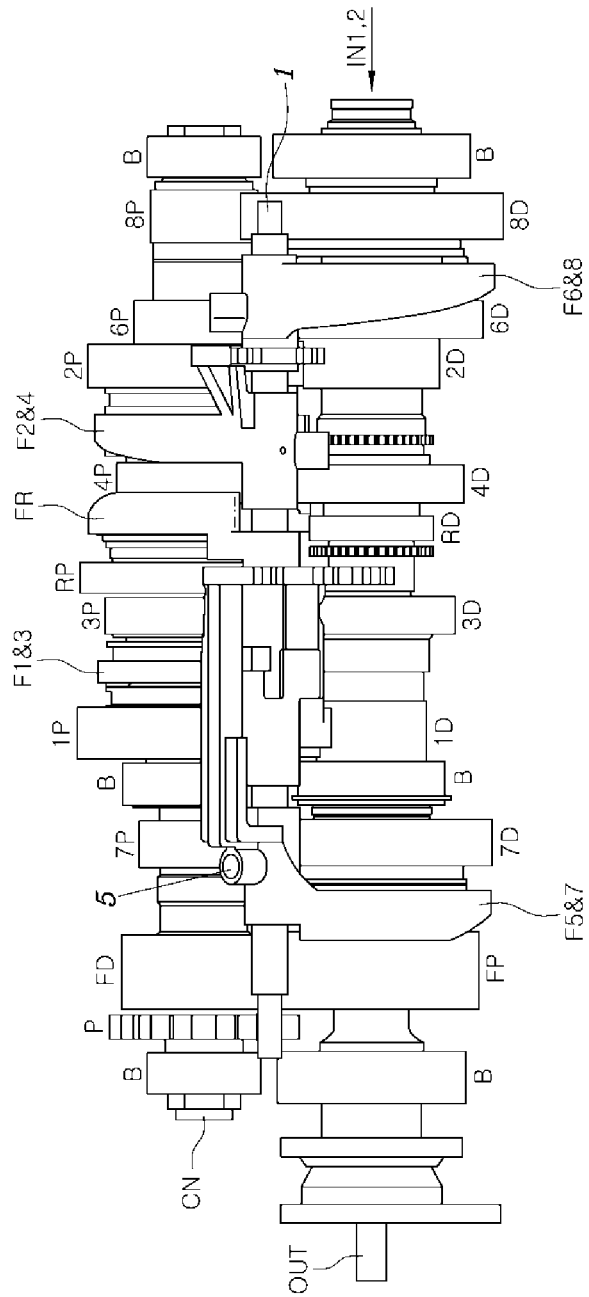
FIG. 1 is a view illustrating a configuration of a dual clutch transmission according to an exemplary embodiment of the present invention.

It should be understood that the appended drawings are not necessarily to scale, presenting a somewhat simplified representing of various features of illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, FIG. 2, FIG. 3, FIG. 4, and FIG. 5, a dual clutch transmission according to an exemplary embodiment of the present invention is configured to include a first input shaft IN1 including a plurality of odd stage driving gears; a second input shaft IN2 disposed to have a concentric shaft with the first input shaft IN1 and including a plurality of even stage driving gears; an output shaft OUT disposed to have a concentric shaft with the first input shaft IN1; a counter shaft CN disposed parallel to the first input shaft IN1, the second input shaft IN2, and the output shaft OUT to always transfer power to the output shaft OUT and including odd stage driven gears engaged with the odd stage driving gears and even stage driven gears engaged with the even stage driving gears; a plurality of synchronous devices included in the first input shaft IN1, the second input shaft IN2, and the counter shaft CN; a plurality of shift forks coupled to the plurality of synchronous devices; and one shift rail 1 configured to commonly guide a linear sliding of the plurality of shift forks.

That is, according to an exemplary embodiment of the present invention, when a plurality of shift stages are implemented, it is possible to reduce the weight and size of the transmission by making use of only one shift rail 1 so that the shift stages do not interfere with each other and a pre-engagement, which is a main feature of a dual clutch transmission (DCT), is implemented, making it possible to configure a compact transmission.

The first input shaft IN1 is connected to a power source by a first clutch CL1 to intermit a state of receiving power from the power source including an engine, the second input shaft IN2 is connected to the power source by a second clutch CL2, and according to the present exemplary embodiment, the second input shaft IN2 is formed as a hollow shaft surrounding external side of the first input shaft IN1.

The odd stage driving gears of the first input shaft IN1 and the even stage driving gears of the second input shaft IN2 are disposed on a straight line to be classified into an odd stage driving gear group and an even stage driving gear group, and a reverse driving gear RD is disposed between the odd stage driving gear group and the even stage driving gear group.

The transmission according to the present exemplary embodiment is configured to implement a series of forward shift stages and a reverse shift stage of first to eighth stages, and an upper shift stage has a smaller shift ratio, wherein the odd stages refer to a first stage, a third stage, a fifth stage, and a seventh stage, and the even stages refer to a second stage, a fourth stage, a sixth stage, and an eighth stage.

The odd stage driving gears refer to a first stage driving gear 1D, a third stage driving gear 3D, and a seventh stage driving gear 7D, and a fifth stage shift stage has a shift ratio of 1:1 that is implemented by directly connecting the first input shaft IN1 and the output shaft OUT as described below, wherein the shift stages less than the fifth stage implement deceleration having a shift ratio greater than 1, and the shift stages of a sixth stage or more implement overdrive having a shift ratio which is smaller than 1.

For reference, the counter shaft CN includes a final driving gear FD, and the output shaft includes a final driven gear FP engaged with the final driving gear FD.

The even stage driving gears refer to a second stage driving gear 2D, a fourth stage driving gear 4D, a sixth stage driving gear 6D, and an eighth stage driving gear 8D.

Therefore, the reverse driving gear RD is disposed at the center along a longitudinal direction of the first input shaft IN1 and the second input shaft IN2, a group of the odd stage driving gears is disposed on one side of the center, and a group of the even stage driving gears is disposed on the other side of the center, wherein the odd stage driving gears and the even stage driving gears are not mixed with each other.

The even stage driving gear group includes four driving gears, the shift stages implemented by two driving gears which are adjacent to each other on both sides among the four driving gears disposed in a line are disposed to have a difference of two stages, and the intermediate two driving gears among the four driving gears are disposed to have a difference of the shift stage of four or more stages.

That is, according to the present exemplary embodiment, the four driving gears included in the even stage driving gear group have the eighth stage driving gear 8D, the sixth stage driving gear 6D, the second stage driving gear 2D, and the fourth stage driving gear 4D which are sequentially disposed. As a result, the shift stages implemented by the eighth stage driving gear 8D and the sixth stage driving gear 6D have a difference of two stages, the shift stages implemented by the second stage driving gear 2D and the fourth stage driving gear 4D have a difference of two stages, and the sixth stage driving gear 6D and the second stage driving gear 2D, which are the intermediate two driving gears, have a difference of the shift stage of four stages.

The arrangement of the shift stages as described above is configured to allow the synchronous devices for performing a shift between the shift stages to secure independent controllability without interference or influence with each other as described below.

The odd stage driving gear group includes three driving gears, the shift stages implemented by two driving gears which are adjacent to each other among the three driving gears disposed in a line are disposed to have a difference of two stages, and the center driving gear and the remaining one driving gear are disposed to have a difference of the shift stage of four or more stages.

That is, according to the present exemplary embodiment, the three driving gears included in the odd stage driving gear group have the third stage driving gear 3D, the first stage driving gear 1D, and the seventh stage driving gear 7D which are sequentially disposed. As a result, the shift stages implemented by the third stage driving gear 3D and the first stage driving gear 1D, which are two driving gears which are adjacent to each other among the three driving gears, are disposed to have a difference of two stages, and the first stage driving gear 1D, which is the center driving gear, and the seventh stage driving gear 7D, which is the remaining one driving gear, are disposed to have a difference of the shift stage of four or more stages.

The arrangement of the shift stages as described above is configured to allow the synchronous devices for performing a shift between the shift stages to secure independent controllability without interference or influence with each other, as described below.

As described above, the shift ratio of the third stage, which is the shift stage formed by the third stage driving gear 3D, is greater than 1, the shift ratio of the seventh stage, which is the shift stage formed by the seventh stage driving gear 7D, is smaller than 1, and the shift ratio of the fifth stage shift stage between the third stage and the seventh stage is 1, which is implemented by directly connecting the first input shaft IN1 and the output shaft OUT.

The fourth stage driving gear 4D and the third stage driving gear 3D are each disposed on both sides of the reverse driving gear RD, and an eighth stage driven gear 8P, a sixth stage driven gear 6P, a second stage driven gear 2P, a fourth stage driven gear 4P, a reverse driven gear RP, a third stage driven gear 3P, a first stage driven gear 1P, and a seventh stage driven gear 7P are sequentially disposed on the counter shaft CN.

In addition, the second input shaft IN2 includes a 6&8 synchronous device S6&8 to switch from a neutral state to a state in which the sixth stage driving gear 6D and the eighth stage driving gear 8D are respectively connected to the second input shaft IN2; the first input shaft IN1 includes a 5&7 synchronous device S5&7 to switch from the neutral state to a state in which the seventh stage driving gear 7D and the output shaft OUT are respectively connected to the first input shaft IN1; the counter shaft CN includes a 2&4 synchronous device S2&4 to switch from the neutral state to a state in which the second stage driven gear 2P and the fourth stage driven gear 4P are respectively connected to the counter shaft CN; the counter shaft CN includes a reverse synchronous device SR to switch from the neutral state to a state in which the reverse driven gear RP is connected to the counter shaft CN; and the counter shaft CN includes a 1&3 synchronous device S1&3 to switch from the neutral state to a state in which the first stage driven gear 1P and the third stage driven gear 3P are respectively connected to the counter shaft CN.

The plurality of shift forks include a 6&8 shift fork F6&8 coupled to the 6&8 synchronous device S6&8, a 2&4 shift fork F2&4 coupled to the 2&4 synchronous device S2&4, a reverse shift fork FR coupled to the reverse synchronous device SR, a 1&3 shift fork F1&3 coupled to the 1&3 synchronous device S1&3, and a 5&7 shift fork F5&7 coupled to the 5&7 synchronous device S5&7.

The 6&8 shift fork F6&8, the 2&4 shift fork F2&4, the reverse shift fork FR, the 1&3 shift fork F1&3, and the 5&7 shift fork F5&7 are sequentially disposed in a line on the shift rail 1.

For reference, the respective shift forks are connected to the respective actuators that provide a separate linear displacement, and are configured to engage or disengage the shift stages by being separately and linearly moving on the shift rail 1, respectively.

The plurality of shift forks each include a detent mechanism 5 configured to provide an elastic force to a detent groove 3 formed in the shift rail 1, to move and maintain a stable and accurate position for the shift rail 1.

Of course, as the detent mechanism 5, a configuration in which a ball, or the like, supported by a spring is formed in the detent groove 3 to be elastically pressed as in the conventional known art may be used.

As described above, since one shift rail 1 needs to be disposed in a state in which each of the shift forks includes the detent mechanism 5 as described above, the length of a boss that the shift fork surrounds the shift rail 1 needs to be sufficient to configure the detent mechanism 5. However, five shift forks need to be disposed on one shift rail 1, and the interval between the bosses that the respective shift forks surround the shift rail 1 becomes very narrow. Since such an interval of the shift forks becomes the operational range of the shift forks, a tradeoff relationship is formed between securing appropriate strength of the shift fork and securing appropriate operability thereof.

The present invention configures the arrangement of the shift stages and the arrangement of the respective shift forks as described above, to configure the tradeoff relationship as described above in a harmonious balance state.

That is, when any one of the five shift forks disposed on the one shift rail 1 is moved to one side to form the shift stage, the bosses of the five shift forks are close to contact a boss of an adjacent shift fork. In the present state, even though the adjacent shift fork is moved in a direction opposite to the direction in which the shift fork is moved, and only a distance that the shift may not be performed is secured, according to an exemplary embodiment of the present invention, it is possible to implement a pre-engagement, which is a main function of the DCT, without interference with each other by the arrangement of the shift stages and the arrangement of the shift forks, and to smoothly perform shift operation without interference or interruption by the operation of the adjacent shift fork.

For example, the first stage and the reverse stage will be described. Since the 1&3 shift fork F1&3 needs to be moved to the left based on FIG. 1 and FIG. 2 to engage the first stage according to an exemplary embodiment of the present invention, and the reverse shift fork FR needs to be moved to the left to form the reverse stage, a state in which the first stage and the reverse stage are simultaneously engaged may be secured.

The present case means that the shift of the first stage and the reverse stage (R stage) is immediately performed when the engagement is performed by changing only the first clutch CL1 and the second clutch CL2, in a D-R lurch shift situation in which a driver changes a shift lever into a D range and an R range.

In a case in which because the positions of the first stage driven gear 1P and the third stage driven gear 3P are reversely set, unlike the present invention, the 1&3 shift fork F1&3 needs to be moved to the right to engage the first stage and the reverse shift fork FR needs to be moved to the left similar to the above to form the reverse stage. Since the 1&3 shift fork F1&3 and the reverse shift fork FR are immediately adjacent to each other and an interval therebetween is limited, the boss of the 1&3 shift fork F1&3 and the boss of the reverse shift fork FR interfere with each other, thereby it is impossible to form the state in which the first stage and the reverse stage are simultaneously engaged.

In addition, in the configuration in which the four even stage driving gears and the even stage driven gears are disposed in the order of the eighth stage, the sixth stage, the second stage, and the fourth stage, and the shift is performed by the 6&8 shift fork F6&8 and the 2&4 shift fork F2&4, the fourth stage and the sixth stage are configured not to be adjacent to each other, making it possible to implement a completely independent control without affecting each other at the time of a shift operation to the fourth stage and the sixth stage.

Unlike the above-mentioned configuration, in a case in which the fourth stage and the sixth stage are disposed to be adjacent to each other and the shift is performed by different shift forks, that is, in a case in which the positions of the second stage and the fourth stage are reversed in the same configuration as the present invention, for example, when the 6&8 shift fork F6&8 needs to be moved to the left to engage the sixth stage in a state in which the 2&4 shift fork F2&4 is moved to the right to engage the fourth stage, when the 6&8 shift fork F6&8 is moved to the left while moving the 2&4 shift fork F2&4 to the right, the fourth stage may be disengaged and the sixth stage may be engaged. However, in the present case, for example, when a situation in which a response of the actuator moving the 2&4 shift fork F2&4 is delayed, or the like occurs, the boss of the 6&8 shift fork F6&8 collides with or interferes with the boss of the 2&4 shift fork F2&4, which may cause a situation in which it is difficult to perform the proper shift control.

That is, according to an exemplary embodiment of the present invention, it is also possible to prevent in advance a control problem which may be caused by deviation of the actuator or deviation of operation speed of the respective shift forks as described above. Such a configuration is also applicable to the odd stages.

In addition, as described above, the dual clutch transmission according to an exemplary embodiment of the present invention is configured so that the pre-engagement operation is smoothly implemented. Since the reverse driving gear RD, the reverse driven gear RP, and the reverse shift fork FR for implementing the reverse stage are disposed between the odd stages and the even stages as described above, it is also possible to operate any one of the 2&4 shift fork F2&4 and the 6&8 shift fork F6&8 of the right to pre-engage any even stage when any odd stage on the left of the reverse driving gear RD of FIG. 1 is a current shift stage, and inversely, there is no obstacle to pre-engage any odd stage on the left of the reverse driving gear RD when the even stage is the current shift stage.

For example, since the pre-engagement from the third stage engagement state to the fourth stage secures a space in which the 2&4 shift fork F2&4 may be moved to the left independently from the 1&3 shift fork F1&3 by the intermediate reverse shift fork FR, even though the 1&3 shift fork F1&3 is moved to the right, there is not interference in forming the fourth stage.

Figure 2:
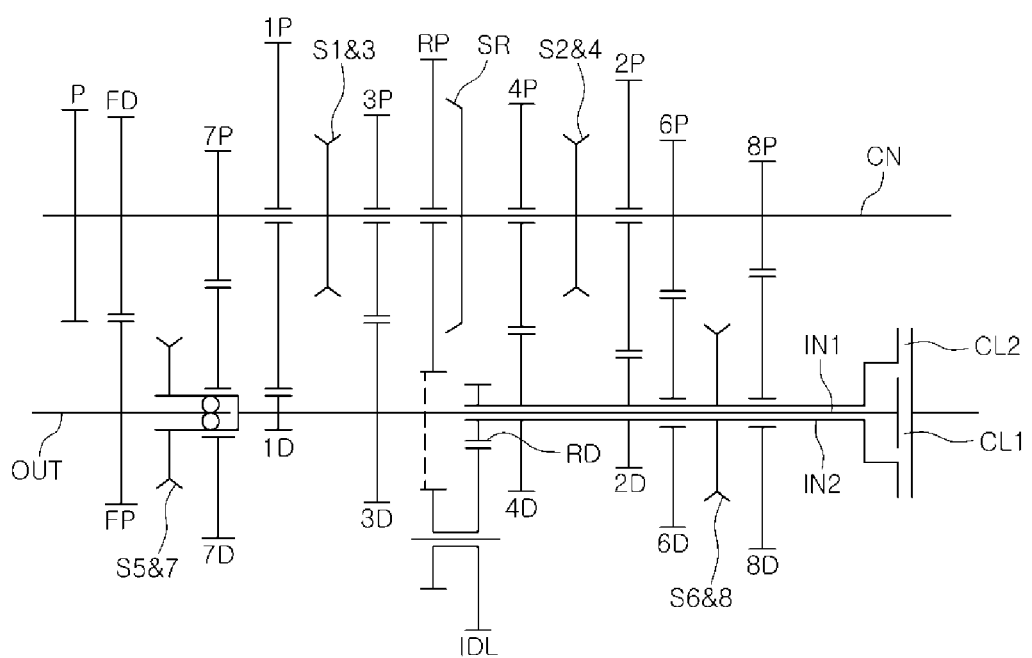
FIG. 2 is a simple configuration view of the transmission of FIG. 1.
Figure 3:
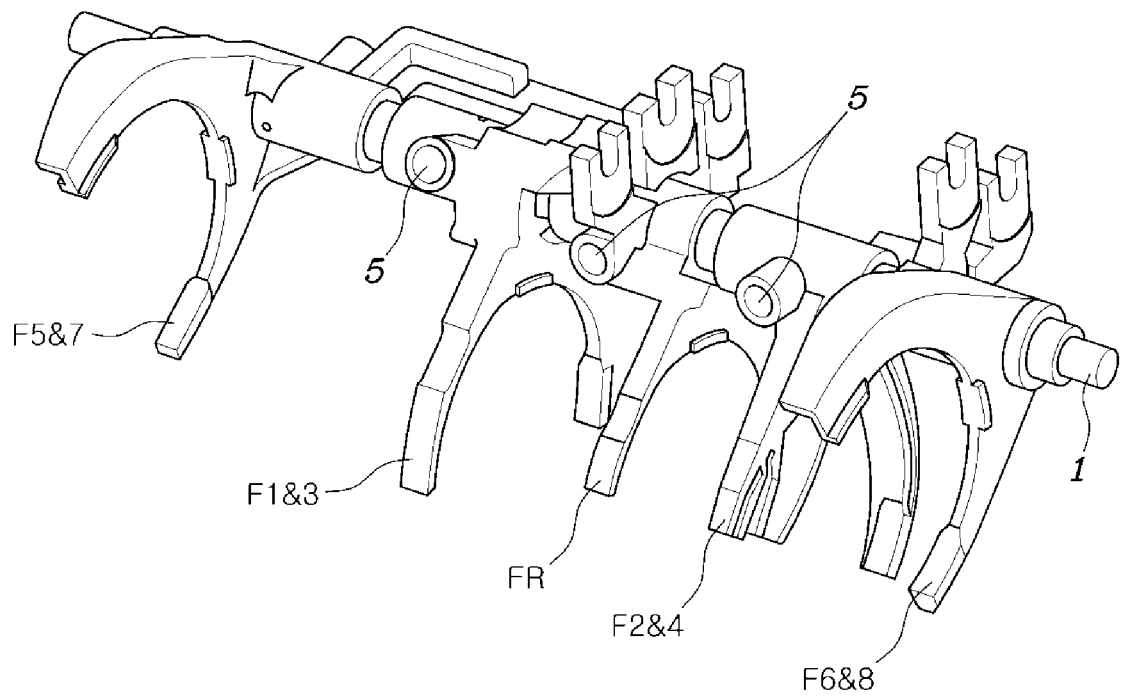
FIG. 3 is a perspective view illustrating a shift operating mechanism of FIG. 1.
Figure 4:
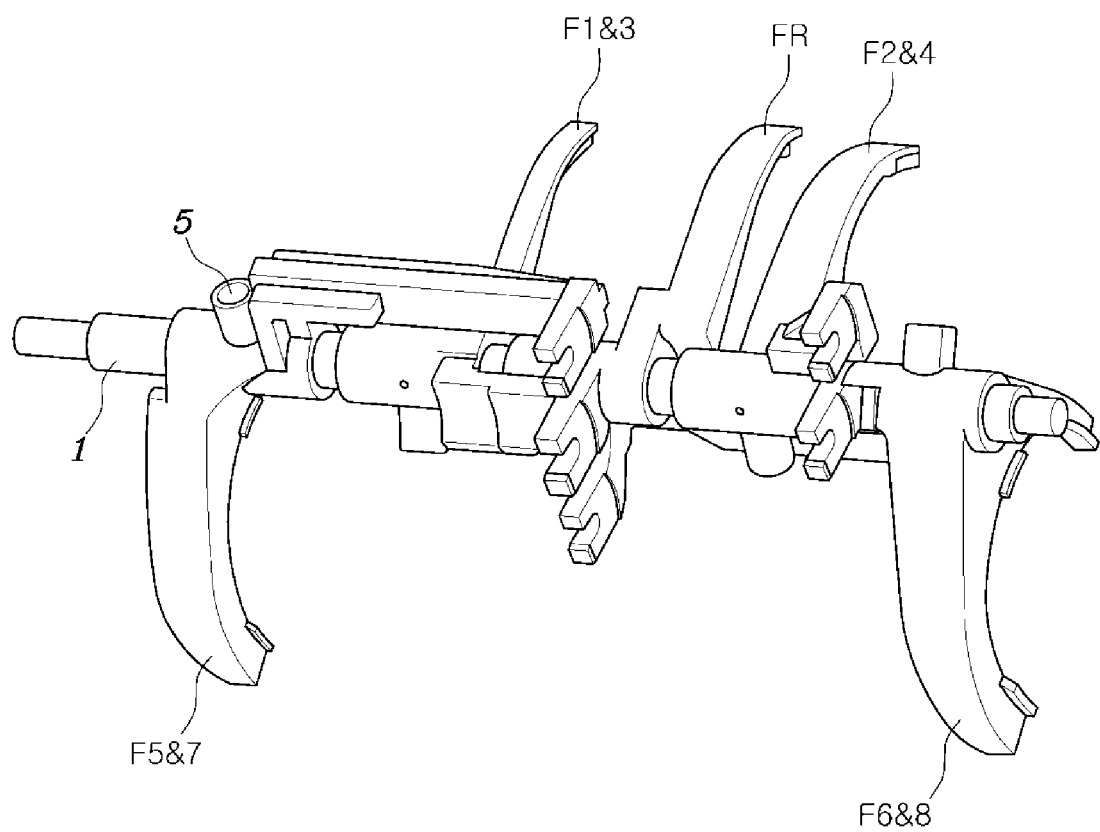
FIG. 4 is a perspective view illustrating the shift operating mechanism of FIG. 3 when being viewed from another angle.
Figure 5:
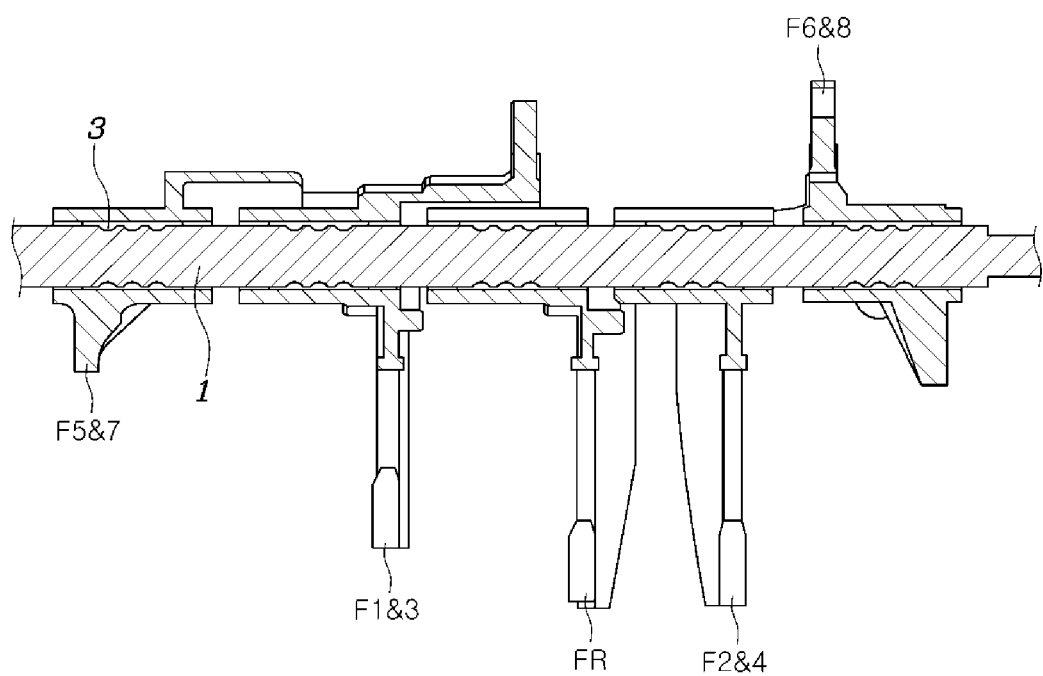
FIG. 5 is a cross-sectional view of the shift operating mechanism of FIG. 4 taken along a shift rail.

For reference, FIG. 2 illustrates a reverse idler IDL which is omitted in FIG. 1, which connects the reverse driving gear RD and the reverse driven gear RP to implement the reverse stage.

For reference, "B" in FIG. 1 refers to a bearing, and "P" refers to a parking gear.

According to the exemplary embodiment of the present invention, the mountability on the vehicle may be improved and the size and weight of the transmission may be reduced to improve fuel efficiency of the vehicle, by accurately and smoothly performing the required shift operation without causing an increase of the overall length of the transmission while configuring the arrangement of the shift operating mechanism as simple as possible in the dual clutch transmission configured to implement the plurality of shift stages.

For convenience in explanation and accurate definition in the appended claims, the terms "upper", "lower", internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dual clutch transmission comprising:
a first input shaft including a plurality of odd stage driving gears;
a second input shaft disposed to have a concentric shaft with the first input shaft and including a plurality of even stage driving gears;
an output shaft disposed to have a concentric shaft with the first input shaft;
a counter shaft disposed parallel to the first input shaft, the second input shaft, and the output shaft to continuously transfer power to the output shaft and including odd stage driven gears engaged with the odd stage driving gears and even stage driven gears engaged with the even stage driving gears;
a plurality of synchronous devices included in the first input shaft, the second input shaft, and the counter shaft;
a plurality of shift forks coupled to the plurality of synchronous devices; and
a shift rail provided to commonly guide a linear sliding of the plurality of shift forks, wherein the odd stage driving gears of the first input shaft and the even stage driving gears of the second input shaft are disposed on a straight line to be classified into an odd stage driving gear group and an even stage driving gear group, wherein a reverse driving gear is disposed between the odd stage driving gear group and the even stage driving gear group, and wherein the even stage driving gear group includes four driving gears, shift stages implemented by two driving gears which are adjacent to each other on a first side and a second side thereof among the four driving gears disposed in a line are disposed to have a difference of two stages, and intermediate two driving gears among the four driving gears are disposed to have a difference of a shift stage of four or more stages.

2. The dual clutch transmission of claim 1, wherein the four driving gears included in the even stage driving gear group have an eighth stage driving gear, a sixth stage driving gear, a second stage driving gear, and a fourth stage driving gear which are sequentially disposed.

3. The dual clutch transmission of claim 2, wherein the odd stage driving gear group includes three driving gears, the shift stages implemented by two driving gears which are adjacent to each other among the three driving gears disposed in a line are disposed to have a difference of two stages, and a center driving gear and a remaining one driving gear are disposed to have a difference of the shift stage of four or more stages.

4. The dual clutch transmission of claim 3, wherein the three driving gears included in the odd stage driving gear group have a third stage driving gear, a first stage driving gear, and a seventh stage driving gear which are sequentially disposed.

5. The dual clutch transmission of claim 4, wherein a shift ratio of a third stage, which is a shift stage formed by the third stage driving gear is greater than 1;

a shift ratio of a seventh stage, which is a shift stage formed by the seventh stage driving gear is smaller than 1; and a shift ratio of a fifth stage shift stage between the third stage and the seventh stage is 1, which is implemented by directly connecting the first input shaft and the output shaft.

6. The dual clutch transmission of claim 5, wherein the fourth stage driving gear and the third stage driving gear are each disposed on a first side and a second side of the reverse driving gear; and an eighth stage driven gear, a sixth stage driven gear, a second stage driven gear, a fourth stage driven gear, a reverse driven gear, a third stage driven gear, a first stage driven gear, and a seventh stage driven gear are sequentially disposed on the counter shaft.

7. The dual clutch transmission of claim 6, wherein the second input shaft includes a 6&8 synchronous device to switch from a neutral state to a state in which the sixth stage driving gear and the eighth stage driving gear are respectively connected to the second input shaft;

the first input shaft includes a 5&7 synchronous device to switch from the neutral state to a state in which the seventh stage driving gear and the output shaft are respectively connected to the first input shaft;

the counter shaft includes a 2&4 synchronous device to switch from the neutral state to a state in which the second stage driven gear and the fourth stage driven gear are respectively connected to the counter shaft;

the counter shaft includes a reverse synchronous device to switch from the neutral state to a state in which the reverse driven gear is connected to the counter shaft; and the counter shaft includes a 1&3 synchronous device to switch from the neutral state to a state in which the first stage driven gear and the third stage driven gear are respectively connected to the counter shaft.

8. The dual clutch transmission of claim 7, wherein the plurality of shift forks include a 6&8 shift fork coupled to the 6&8 synchronous device, a 2&4 shift fork coupled to the 2&4 synchronous device, a reverse shift fork coupled to the reverse synchronous device, a 1&3 shift fork coupled to the 1&3 synchronous device, and a 5&7 shift fork coupled to the 5&7 synchronous device.

9. The dual clutch transmission of claim 8, wherein the plurality of shift forks each include a detent mechanism configured to provide an elastic force to a detent groove formed in the shift rail, move and maintain a position for the shift rail.

10. The dual clutch transmission of claim 9, wherein the 6&8 shift fork, the 2&4 shift fork, the reverse shift fork, the 1&3 shift fork, and the 5&7 shift fork are sequentially disposed in a line on the shift rail.

* * * * *